(12) United States Patent
Smith

(10) Patent No.: US 8,725,574 B2
(45) Date of Patent: May 13, 2014

(54) METHODS AND SYSTEMS FOR PAYMENT ACCOUNT ISSUANCE OVER A MOBILE NETWORK

(75) Inventor: Theresa L. Smith, Herts (GB)

(73) Assignee: MasterCard International Incorporated, Purchase, NY (US)

( * ) Notice: Subject to any disclaimer, the term of this patent is extended or adjusted under 35 U.S.C. 154(b) by 686 days.

(21) Appl. No.: 12/619,908

(22) Filed: Nov. 17, 2009

(65) Prior Publication Data
US 2010/0125508 A1 May 20, 2010

Related U.S. Application Data

(60) Provisional application No. 61/115,207, filed on Nov. 17, 2008.

(51) Int. Cl.
*G06Q 20/00* (2012.01)
(52) U.S. Cl.
USPC ............................................................ 705/16

(58) Field of Classification Search
None
See application file for complete search history.

(56) References Cited

U.S. PATENT DOCUMENTS

| | | | |
|---|---|---|---|
| 2003/0004879 A1* | 1/2003 | Demoff et al. | 705/44 |
| 2005/0065876 A1* | 3/2005 | Kumar | 705/39 |
| 2007/0266131 A1* | 11/2007 | Mazur et al. | 709/223 |

\* cited by examiner

*Primary Examiner* — Paul Danneman
(74) *Attorney, Agent, or Firm* — Buckley, Maschoff & Talwalkar LLC

(57) ABSTRACT

According to some embodiments, a request for a new payment account may be received in connection with a mobile device, such as a wireless telephone. A temporary payment account number ("PAN") may then be automatically assigned to the request. The temporary PAN may be mapped to a mobile PAN, and data to facilitate a personalization of the mobile device with the mobile PAN may be transmitted. The mobile device may then be used, for example, in connection with a near field communications enabled purchasing transaction.

20 Claims, 6 Drawing Sheets

METHODS AND SYSTEMS FOR PAYMENT ACCOUNT ISSUANCE OVER A MOBILE NETWORK

CROSS REFERENCE TO RELATED APPLICATIONS

The present application claims priority under 35 U.S.C. §119(e) to U.S. Provisional Patent Application No. 61/115,207 entitled "Methods and Systems for Instant Payment Account Issuance Over a Mobile Network" filed on Nov. 17, 2008. The entire contents of that application are incorporated herein by reference.

BACKGROUND

Mobile telephones and other mobile communications devices (such as personal digital assistants) are carried by millions of consumers. There have been a number of attempts to integrate payment applications with these mobile devices. One approach, introduced by MasterCard International Incorporated, the assignee of the present application, is to securely install a payment application in mobile phones that are Near Field Communications (NFC)-enabled, allowing the phones to be used as a payment device in contactless payment transactions. For example, these mobile phones may be configured to conduct payment transactions using a NFC payment protocol, such as the PayPass® payment protocol. In some cases, there may be a delay between a request from a consumer to activate a payment account in connection with a mobile device and the time at which an issuer can establish an actual account in response to that request. Such a delay may be frustrating to a consumer who want to use his or her mobile device to complete a purchase transaction.

It may therefore be desirable to allow consumers to activate such a payment application on a consumer's mobile phone and then instantly, that is to say within a relatively brief period of time, use the mobile phone in a payment transaction.

DESCRIPTION

Embodiments of the present invention relate to systems, methods, processes, computer program code, and means for issuing payment accounts over a mobile network. In some embodiments, payment accounts are issued shortly, or substantially instantly, after a request by a customer. In some embodiments, a payment account identifier is usable shortly, or substantially instantly, after a request by a customer. In some embodiments, after issuance of the payment account, a mobile device can be used to conduct payment transactions involving the payment account.

As used herein, the phrase "mobile device" may refer to a mobile or portable telephone or other communication device. Pursuant to some embodiments, the mobile device may be a device that is capable of receiving, installing, or updating content or applications using a standard protocol such as the Wireless Application Protocol ("WAP"). Pursuant to some embodiments, the mobile device is a Near Field Communication (or "NFC") enabled device (e.g., such as a device configured to communicate with PayPass® enabled terminals and other readers). Those skilled in the art, upon reading this disclosure, will recognize that embodiments of the present invention are not limited to use with PayPass® transactions, and that features of the present invention may be used with other mobile devices and payment protocols.

In some embodiments, features of the present invention allow a payment account issuing financial institution (an "issuer") to effect instant issuance of a payment account (such as a PayPass account) over a mobile network to a mobile device without the need to set up the payment account within the issuer systems at the time of issuance. For example, the issuer may issue the payment account and a temporary payment account number (or "temporary PAN"), and allow the account holder to access the account during a time period in which the issuer systems are updated to include the actual payment account number (or "actual PAN"). When the issuer systems have been updated and an actual PAN has been assigned to the payment account, the temporary PAN is no longer used in transactions involving that account holder. The result is a system and methods which allow account holders to use their new payment account substantially instantly after applying and being approved for the account.

Figure 1:
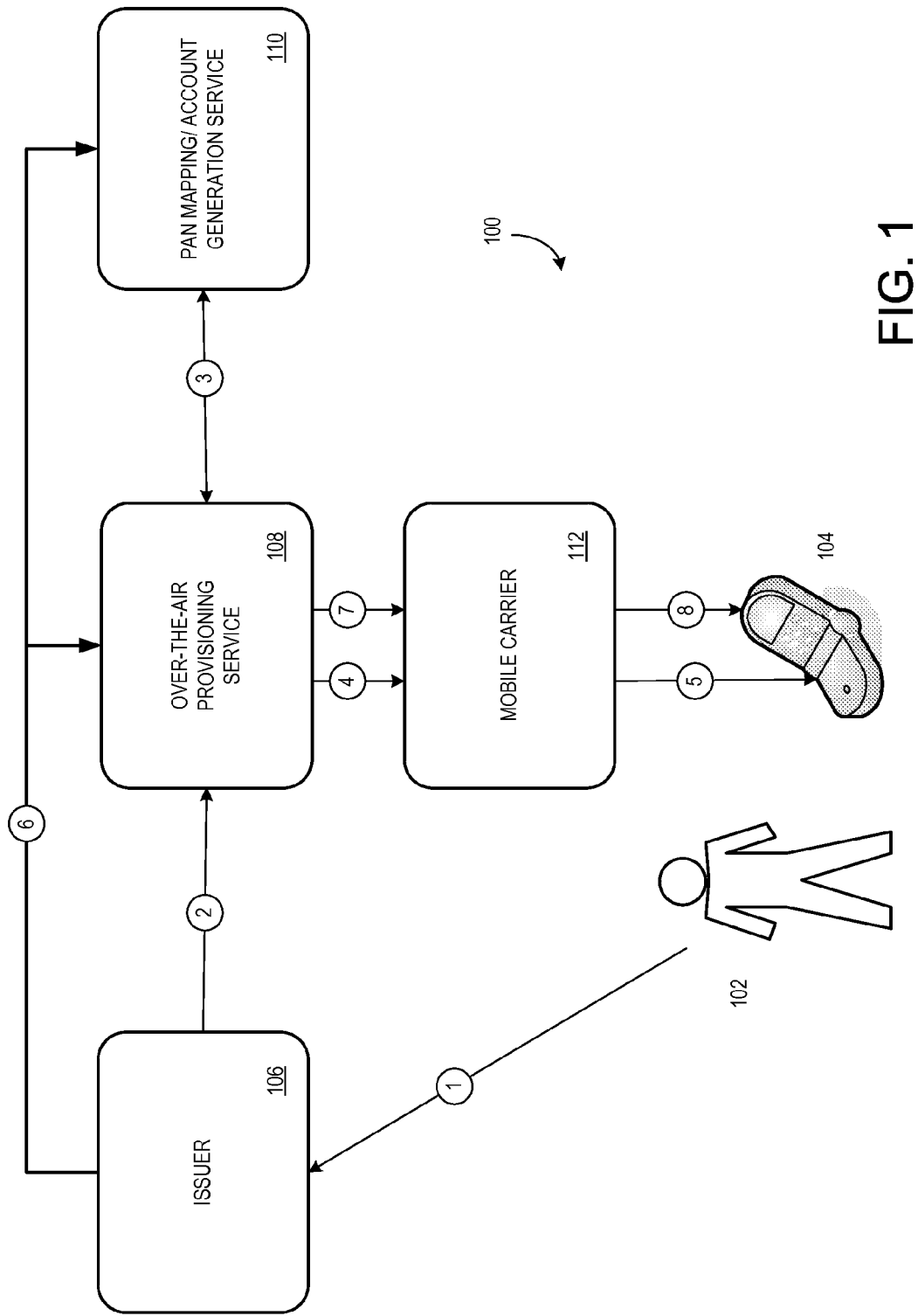
FIG. 1 is a block diagram depicting a payment system configured pursuant to some embodiments.

Features of some embodiments of the present invention will be described by reference to FIG. 1, which is a block diagram of a system 100 pursuant to some embodiments. As shown, the system 100 has a number of entities or devices which interact to allow a customer 102 (who has a mobile device 104) to apply for, and be issued, a payment account which may be accessed by using the mobile device 104 to conduct purchase transactions using the newly-issued account. For example, system 100 may include one or more issuer systems 106, an over-the-air (or "OTA") provisioning service 108, a primary account number (or "PAN") mapping and account generation service 110, and one or more mobile carrier networks 112. Some of the systems or processes may be operated by, or on behalf of, one or more entities. For example, in some embodiments, the OTA provisioning service 108 and the PAN mapping/account generation service 110, are operated by or on behalf of a payment network (e.g., such as the network operated by MasterCard International Incorporated). Some or all of the systems or entities may be in communication over networks such as the Internet, or private or secure networks.

Pursuant to some embodiments, a customer 102 may contact an issuer 106 to request the issuance of a payment account such that the payment account is accessible using a mobile device 104 associated with the customer. In some embodiments, the customer 102 may interact with the issuer 106 via one or more web sites or by contacting a customer service representative associated with the issuer 106. However the contact is made, the customer 102 is guided through a registration process in which the customer selects a verification code that will be used in a mobile device 104 personalization process. The customer 102 may also provide application information that is used by the issuer 106 to determine whether to issue a payment account to the customer 102. This interaction between the issuer 106 and the customer 102 is identified as transaction "1" on FIG. 1.

Upon completion of the registration transaction, the issuer 106 selects (or retrieves) a temporary PAN and assigns it to the customer's registration data. The issuer 106 transmits data elements associated with the transaction to an OTA provisioning service 108 (shown as transaction "2"). In some embodiments, the data elements are transmitted using a secure web service or other data protocol, such as a Simple Object Access Protocol ("SOAP") service. In particular, in some embodiments, the data passed from the issuer 106 to the OTA provisioning service 108 are provided in a request to provision a new account with the temporary PAN. The issuer 106 may also provide one or more risk data elements which the issuer may use to define transaction parameters in which transactions may be authorized. In some embodiments, the risk parameters are used only during the time period in which the temporary PAN is in use—as will be described further below, the risk parameters may be reset or turned off once the actual PAN has been set up in the issuer systems. For example, an issuer may determine that a customer should only be allowed to conduct transactions of less than $10 during the period before the actual PAN has been issued. Other risk parameters may also be used to further control the customer's ability to transact during the period before the actual PAN is issued. For example, an "overall transaction" limit might be specified (e.g., multiple transactions might not be allowed to exceed $100) and/or transaction type restrictions might be imposed (e.g., no on-line transactions might be permitted).

Upon receipt of the request to provision (or install) the payment application and account information in the customer's mobile device, the OTA provisioning service 108 begins creating a software package or applet for delivery to the customer's mobile device. 104. First, however, a further message (transaction "3") is forwarded from the OTA provisioning service 108 to a PAN mapping/account generation service 110 so that a PayPass PAN (or "PPAN") may be assigned to the mobile device 104. The PAN mapping/account generation service 110 assigns a PPAN to the device 104, and also maps the newly-assigned PPAN to the temporary PAN provided by the issuer 106. The mapping allows transactions involving the temporary PAN to be authorized, cleared and settled. Once the mapping has been established, the newly-assigned PPAN is returned to the OTA provisioning service 108 for inclusion in the software package to be installed on the mobile device 104.

For example, the software package may contain the software code required to install the PPAN, the risk parameters (if any), and other application information in the mobile device 104, so that the payment account may be utilized by the customer. The software package or applet may be, for example, delivered using the WAP protocol (e.g., using a WAP push message), Bearer Independent Protocol ("BIP"), or similar techniques.

Pursuant to some embodiments, the software package is delivered to the mobile device 104 over the mobile carrier 112 network associated with the mobile device 104 (transaction "4"). In some embodiments, when the mobile carrier 112 "pushes" the application to the mobile device 104 (at transaction "5"), the customer 102 may be asked to enter a verification code (selected or created during the customer's interaction with the issuer 106) to confirm the customer's identity and to authorize the installation of the software. Once the identity of the customer 102 is established, the process of personalizing the mobile device 104 with the software (including the PPAN and the risk parameters) is initiated. Personalizing the mobile device 104 may also include storing one or more customer details. Once the personalization or loading of the payment application is complete, the customer 102 may use the mobile device 104 to complete payment transactions. Pursuant to embodiments of the present invention, the customer 102 instantly (or substantially instantly) is able to use the newly-issued payment account, despite the fact that the issuer 106 may not yet have issued an actual PAN for the account.

Pursuant to some embodiments, once the issuer 106 has updated their systems and has issued an actual PAN for the account (which will typically occur some period of time after transaction "5" has been completed, and possibly after the customer 102 has conducted one or more payment transactions using the account), the issuer 106 will transmit a request message (in transaction "6") to the PAN mapping/account generation service 110. The request message is a request that the service 110 update the mapping database with the actual PAN to replace the temporary PAN previously mapped. Upon receipt of the request, the service 110 may update the mapping database to replace the temporary PAN with the actual PAN for the customer account. In some embodiments, the issuer 106 may also transmit (in transaction "6") a message to the OTA provisioning service 108 requesting that any risk parameters be reset or deleted from the mobile device 104. If such a request is transmitted, the modifications to the risk parameters are transmitted (e.g., in a WAP push message) to the mobile device 104 via the mobile carrier 112 network associated with the mobile device 104 (shown as transactions "7" and "8" in FIG. 1).

As a result, a cost effective and secure method may be provided for issuers to extend NFC products by issuing and enabling over-the-air personalization of approved NFC-enabled mobile phones. The over-the-air personalization may provide a secure transfer of the cardholder's payment account information, via a mobile network operator, into the cardholder's NFC-enabled mobile phone. The cardholder may then use his or her mobile phone as a standalone NFC payment device.

Figure 2:
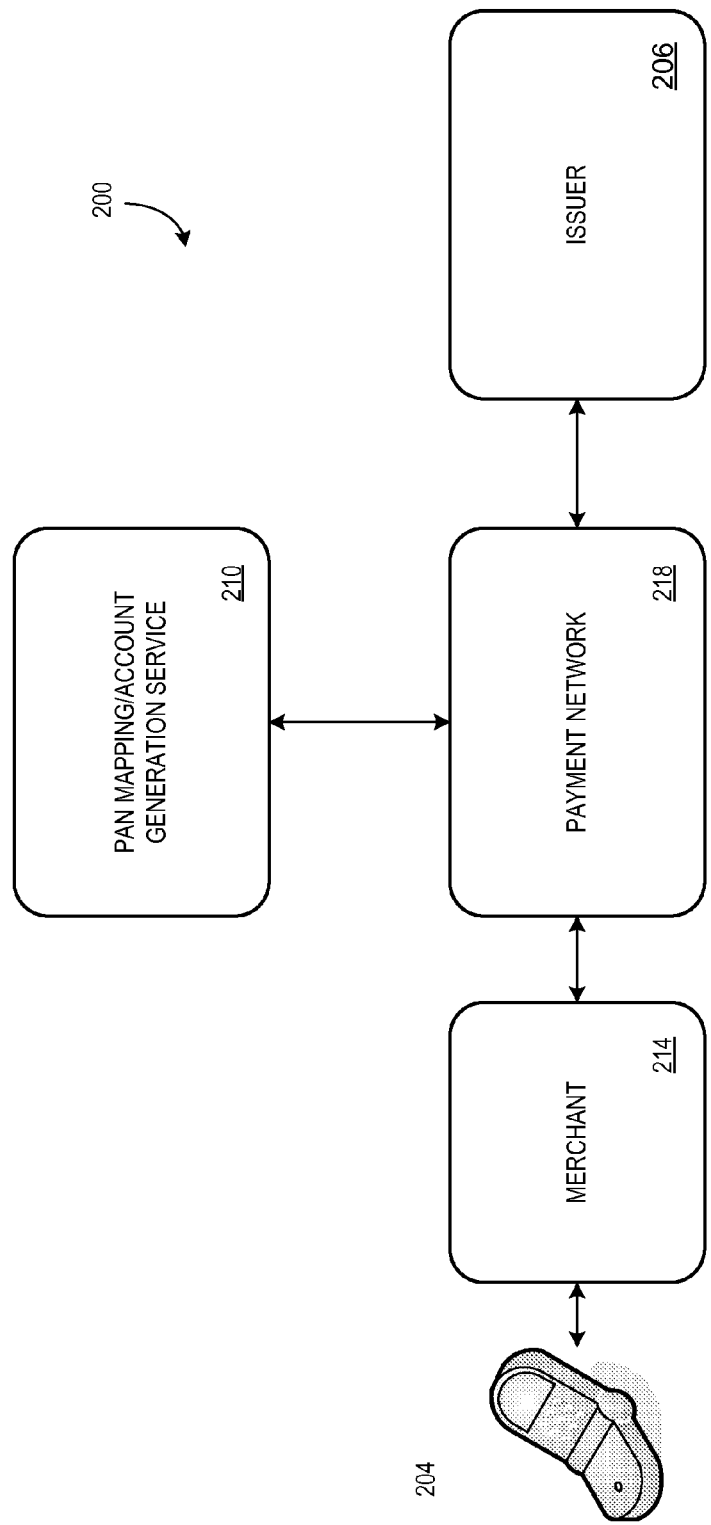
FIG. 2 is a block diagram depicting a payment transaction system pursuant to some embodiments.

Reference is now made to FIG. 2 where a block diagram of a system 200 is shown. System 200 includes a number of components or entities which interact to allow a mobile device 204 to be used to conduct a payment transaction using a payment application stored in the mobile device 204 (e.g., such as the payment application which was provisioned as described in FIG. 1). System 200 may be used to facilitate payment transactions involving a temporary PAN as well as an actual PAN. Transactions involving an actual PAN will not be described herein, as they involve existing techniques. Instead, system 200 will be described with respect to a transaction conducted using a temporary PAN. Transactions involving a temporary PAN may be conducted using a mobile device 204 during the time period after the mobile device 204 has been personalized (as described in conjunction with FIG. 1) and before the issuer 206 has assigned and communicated an actual PAN (e.g., as described in transaction "6" of FIG. 1). That is, transactions involving temporary PANs may include transactions conducted just after the personalization has occurred.

Such a transaction may be initiated by the customer presenting their mobile device 204 at a merchant 214 to complete a purchase. For example, the mobile device 204 may be presented within range of a point of sale device having NFC capabilities. In such a transaction, the point of sale device communicates with the payment application installed in the mobile device 204 using NFC coupling pursuant to a payment standard (such as the PayPass® standard promulgated by MasterCard International Incorporated). In such a transaction, a series of messages (defined by the PayPass® standard) occur, and the point of sale device is provided with information including the PPAN stored in the mobile device 204. In situations where the issuer 206 has also set one or more risk parameters, the risk parameters are also read. Transactions may be conducted either online (where the PPAN and transaction information are transmitted to the issuer 206 for authorization) or, in some embodiments, "offline" (where the transaction is authorized by the payment application in the mobile device without transmission of an authorization request to the issuer 206).

In cases where online authorization is required, the authorization request message is transmitted from the point of sale device to the issuer 206 through a payment network 218. Upon receipt of the authorization request message, the payment network 218 identifies the PPAN and requests a look up of the related PAN from the PAN mapping/account generation service 210. As discussed above, where the issuer 206 has not yet issued an actual PAN, the look up will return the temporary PAN associated with the PPAN. The temporary PAN will be used to route the authorization request to the appropriate issuer 206 for decisioning.

In cases where the transaction is authorized offline, no authorization request is transmitted to the issuer 206. Instead, the PPAN mapping occurs during clearing and settlement of the offline transaction. During the clearing and settlement, the payment network 218 requests a look up of the related PAN from the PAN mapping/account generation service 210 and replaces the PPAN with the temporary PAN so that the transaction may be settled against the temporary PAN. In this manner, both online and offline transactions for newly issued accounts may be reliably and efficiently authorized, cleared, and settled.

Figure 3:
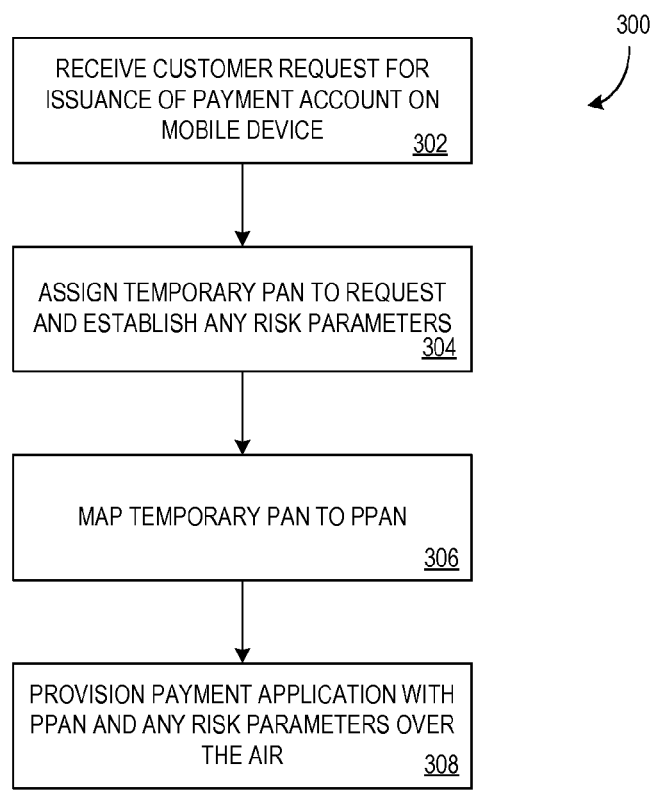
FIG. 3 is a flow diagram depicting an instant issuance process pursuant to some embodiments.

Reference is now made to FIG. 3, where a process 300 for instantly issuing a payment account pursuant to some embodiments is described. Process 300 may be performed by a system such as the system 100 of FIG. 1. For example, process 300 may be performed in response to a request by a customer to be issued a new payment account. Processing begins at 302 where a request for issuance of a payment account on the customer's mobile device is received. As discussed above, the request may be received by the customer via a Website interaction, by phone, or the like.

Processing continues at 304 where the issuer assigns a temporary PAN to the customer's request, and establishes any risk parameters (e.g., for use in controlling the authorization of transactions involving the temporary PAN). The temporary PAN and the risk parameters are provided, along with the customer data, to an OTA provisioning service (such as the service 108 of FIG. 1). Processing continues at 306, where the temporary PAN is mapped to a mobile PAN (e.g., such as a PayPass® PAN, or PPAN). The PPAN is provided to the provisioning service, and the provisioning service causes the mobile device to be personalized with the PPAN, risk parameters, and other related data at 208 so that the customer may use their mobile device in payment applications. As discussed above, the provisioning service may deliver the personalization information using a protocol such as WAP push. The result is an instantly-issued payment account that may be used by the customer almost immediately after submitting a request for a new payment account. As discussed above, once the issuer provisions an actual PAN, the actual PAN may be swapped for the temporary PAN for further use.

The above descriptions of processes herein should not be considered to imply a fixed order for performing the process steps. Rather, the process steps may be performed in any order that is practicable, including simultaneous performance of at least some steps.

Figure 4:
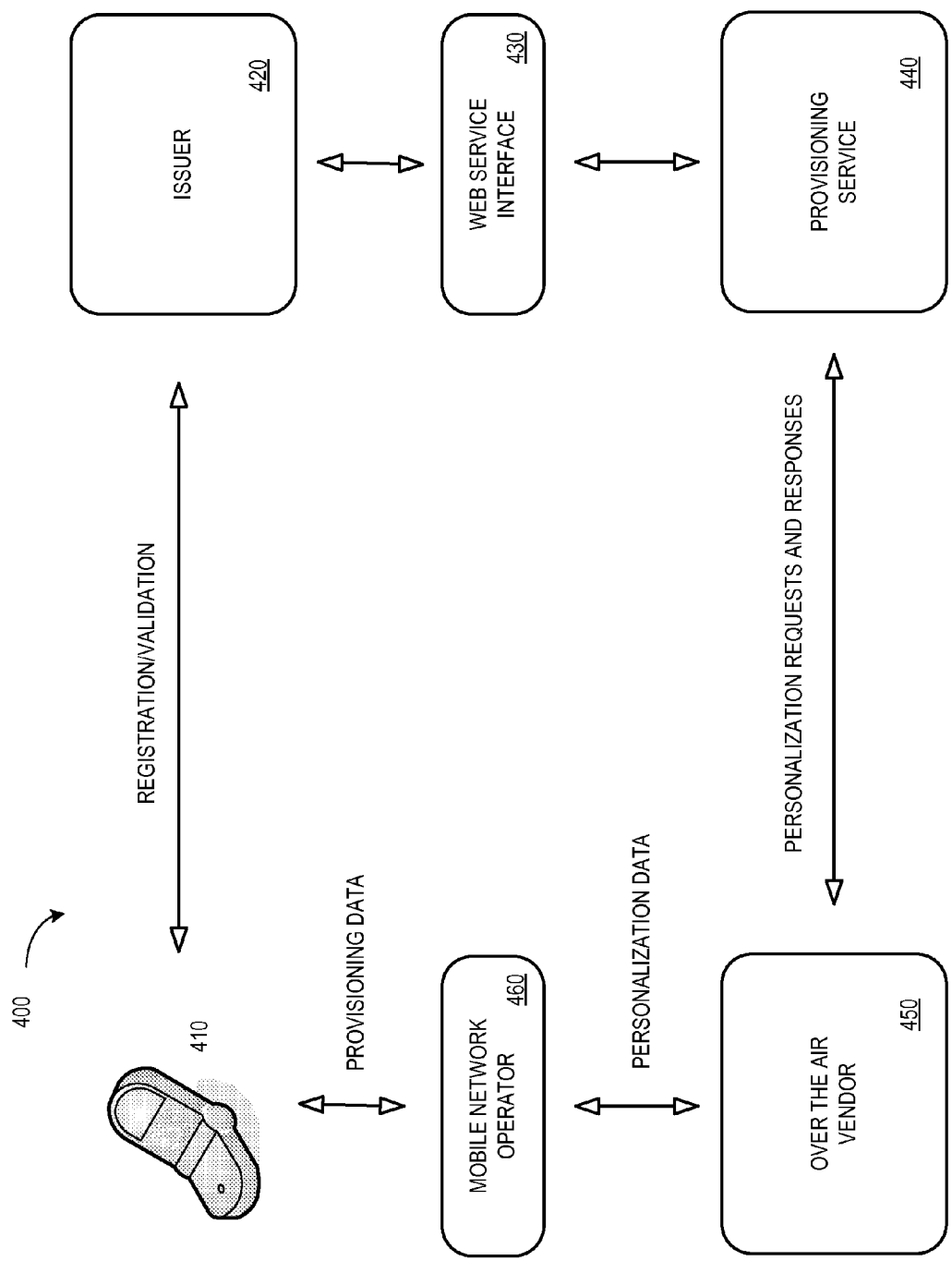
FIG. 4 illustrates an overview of a personalization process according to some embodiments.

FIG. 4 illustrates an overview of a personalization process 400 according to some embodiments. In particular, a consumer/cardholder associated with a mobile telephone 410 might initiate a registration/validation processor with a card issuer 420. For example, the consumer might access a web site operated by issuer 420 and enter details, including his or her personal information, a model number of the mobile telephone 410, a phone number of the mobile telephone 410, and/or an indication of a mobile network operator associated with the telephone 410. According to some embodiments, a one-time PIN or verification code may be established for the consumer during the registration process. Note that the registration process could instead be initiated and/or completed via a call to a Customer Service Representative ("CSR").

The card issuer 420 may validate the application may by the consumer, determine the validity of the request, and ensure that sufficient details about the application have been provided. The card issuer 420 may then send a personalization request to a provisioning service 440 (e.g., an over-the-air provisioning service associated with MasterCard) via a web service interface 430. Once the provisioning service confirms that the data supplied by the issuer 420 is valid, the request may be re-packaged into a standard format and forwarded to a certified over-the-air vendor 450. For example, the provisioning service 440 may transmit a personalization request to the over-the-air vendor 450 via a secure link and record the status (e.g., for later access by the issuer 420 for consumer care and troubleshooting purposes). According to some embodiments, if mapping is selected the provisioning service may obtain or create a PPAN and add it to a PAN mapping database. Note that a mapping service may let an issuer 420 implement dual account number structures. Moreover, multiple NFC-enabled handsets may be managed for a single account. The request transmitted from the provisioning service 440 to the over-the-air vendor 450 might include, for example, a record identifier, an issuer code, a PPAN, an expiration date (e.g., an expiration month and year), a mobile phone number and carrier identifier, a verification code (e.g., selected by the consumer during the registration process), and/or an encryption key for security purposes.

The over-the-air vendor 450 may initiate a Wireless Application Protocol (WAP) session via WAP push to the NFC handset 410 via the mobile network operator 460 using the mobile number that was registered by the consumer during the initial phase of the registration process. Note that the WAP push may allow WAP content to be pushed to the mobile handset 410 with minimal user intervention (e.g., the WAP push may be a specially encoded message that includes a link to a WAP address). According to some embodiments, the consumer may later begin the personal process on the handset 410 and identify themselves as the registered owner of the handset 410 using an authentication Personal Identification Number (PIN) established during registration.

Once the personalization is completed, the consumer may initiate NFC payment transactions with the phone 410 at a retail outlet. That is, the process may culminate in a consumer's NFC-enabled handset 410 being personalized—in substantially real time—with his or her card details and an ability to use the handset 410 to complete transactions.

According to some embodiments, to complete the personalization of the secure element within the phone 410, the issuer 420 may share key information with certified vendors. Note that the mobile over-the-air provisioning service 440 may leverage the security of a key management centre to help streamline the personalization of a NFC enabled payment device. According to some embodiments, a cryptographic management process includes a setup that begins with the issuer 420 delegating to the provisioning service 440 the use of an issuer master key.

Note that Card Security Code ("CSC"), Card Verification Value ("CSV"), and/or Card Verification Code ("CVC") delegation may be employed when issuers use NFC-enabled services for mapping and/or CVC pre-validation. When a personalization request is received, a call may derive the appropriate CVC from an issuer master key and the primary account number that is being personalized. The CVC may then be used to calculate dynamic CVC values when the NFC-enable device is used at a terminal. Note that a CVC may comprise a code algorithmically derived by a NFC-enabled card or device, and the code may be used by a magnetic stripe issuer to authenticate the NFC-enabled card or device initiating a transaction. Using in-house data generation may provide benefits including track data format definition, EMV data format definition, derivation of values necessary for dynamic CVC, derivation of values necessary for EMV card keys, a secure transport of data, and the security of the issuer master key stored in a key management centre. According to some embodiments, elements of the system may support Authorization Request Cryptogram (ARQC) validations.

Figure 5:
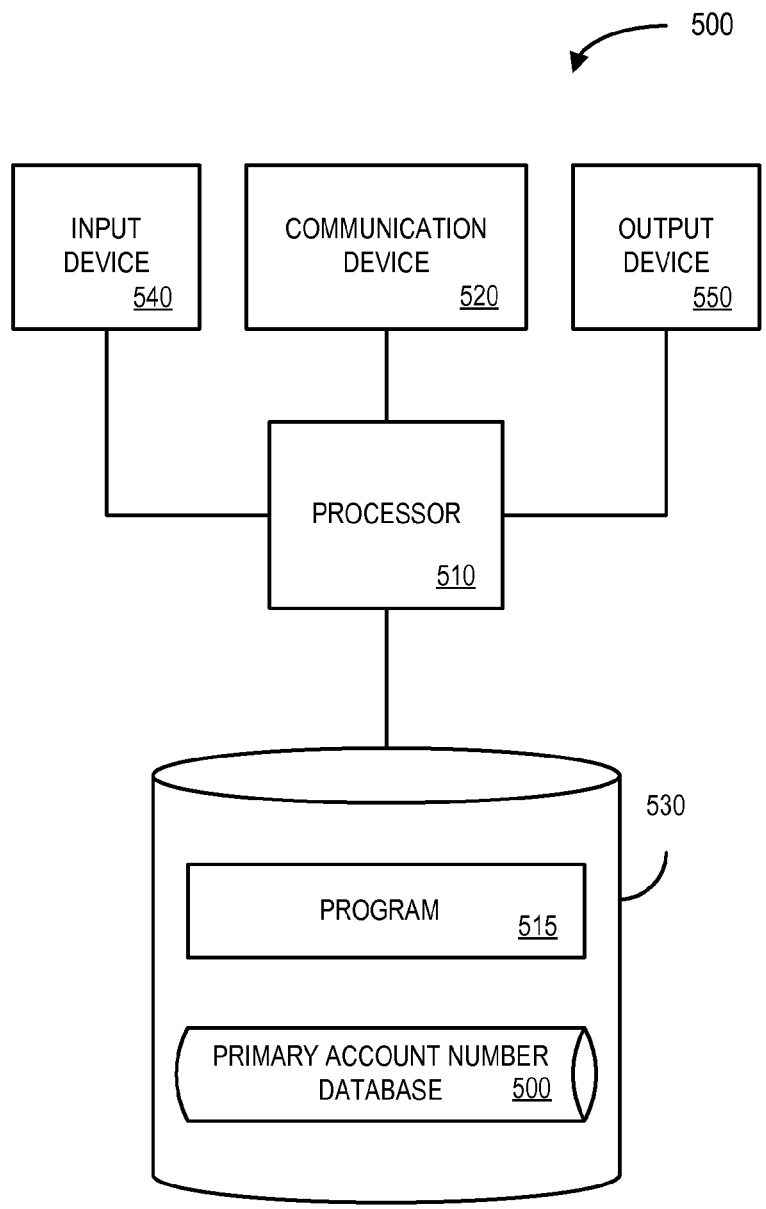
FIG. 5 is a block diagram of a payment account issuing apparatus in accordance with some embodiments of the present invention.

FIG. 5 is a block diagram of a payment account apparatus 500 in accordance with some embodiments of the present invention. The apparatus 500 might, for example, comprise a platform or engine similar to the issuer system 106 illustrated in FIG. 1. The apparatus 500 comprises a processor 510, such as one or more INTEL® Pentium® processors, coupled to a communication device 520 configured to communicate via a communication network (not shown in FIG. 5). The communication device 520 may be used to exchange insurance claim information, for example, with one or more consumers, over the air provisioning services, and/or PAN mapping/account generation services.

The processor 510 is also in communication with an input device 540. The input device 540 may comprise, for example, a keyboard, a mouse, or computer media reader. Such an input device 540 may be used, for example, to receive information about consumers and/or associated payment account. The processor 510 is also in communication with an output device 550. The output device 550 may comprise, for example, a display screen or printer. Such an output device 550 may be used, for example, to provide reports and/or display information associated with consumers, payment accounts, and/or risk parameters.

The processor 510 is also in communication with a storage device 530. The storage device 530 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices. The storage device 530 stores a program 515 for controlling the processor 510. The processor 510 performs instructions of the program 515, and thereby operates in accordance any embodiments of the present invention described herein. For example, the processor 510 may, receive a request for a new payment account and automatically assign a temporary PAN to the request. The processor 500 may also arrange to map the temporary PAN to a mobile PAN facilitate a personalization of a mobile device with the mobile PAN.

As used herein, information may be "received" by or "transmitted" to, for example: (i) the payment account apparatus 500 from other devices; or (ii) a software application or module within the payment account apparatus 500 from another software application, module, or any other source.

As shown in FIG. 5, the storage device 530 also stores a primary account number database 600. One example of such a database 600 that may be used in connection with the payment account apparatus 500 will now be described in detail with respect to FIG. 6. The illustration and accompanying descriptions of the database presented herein are exemplary, and any number of other database arrangements could be employed besides those suggested by the figures. For example, different databases associated with different types of payment accounts or consumers might be associated with the apparatus 500.

Figure 6:
FIG. 6 is a tabular view of a portion of a primary account number database in accordance with some embodiments of the present invention.

FIG. 6 is a tabular view of a portion of the new work primary account number database 600 in accordance with some embodiments of the present invention. The table includes entries associated with consumers how have requested to use a mobile device to complete purchase transactions. The table also defines fields 602, 604, 606, 608, 610 for each of the entries. The fields specify: a consumer identifier 602, a temporary PAN 604, a mobile PAN 606, an actual PAN 608, and one or more risk parameters 610. The information in the database 600 may be periodically created and updated based on information received from consumers and/or when actual PANs are assigned to consumers.

The consumer identifier 602 might be, for example, an alphanumeric code that uniquely identifies a consumer who has requested that his or her mobile device be enabled to complete purchase transactions. The temporary PAN 604 might be selected, for example, from a set of potential temporary PANs before an actual PAN can be established in response to the consumer's request. The mobile PAN 606 may initially be mapped to the temporary PAN 604. The actual PAN 608 may subsequently be assigned to the consumer (and may replace the temporary PAN 604). The risk parameters 610 might represent, for example, restrictions placed on the consumer and payment account before an actual PAN 608 is assigned to his or her request.

Note that a provisioning service might perform functions other than an initial personalization of a mobile phone. For example, a provisioning service might arrange for a mobile phone to be associated with a funding account (e.g., by creating a PPAN and mapping the PPAN to a provided funding account in an account management system), update an NFC-enabled payment account (e.g., to update an expiration month and/or year), disable the payment application on the mobile phone (without or without removing the personalization details), and/or retrieve a transaction event history associated with a particular mobile phone number.

Thus, embodiments may provide an over-the-air provision service that delivers to issuers a capability to provision mobile handsets with NFC payment credentials over wireless networks. Moreover, a web services interface may be established for issuers to initiate provisioning and to receive provisioning lifecycle information. A standardized web services interface from a provisioning service to Trusted Service Managers (TSMs) may execute the provisioning into cardholder handsets (e.g., via dynamic, intelligent routing to multiple TSMs). According to some embodiments, end-to-end security certification may be provided for the real-time performance of provisioning transactions initiated by cardholders.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An apparatus for issuing a payment account for use in a mobile device, comprising:
 a communication device to transmit and receive data to be exchanged via a network;
 a processor coupled to the communication device; and
 a storage device in communication with said processor and storing instructions adapted to be executed by said processor to:
  receive a request including customer data for a new payment account to be associated with a mobile device,
  automatically assign a temporary payment account number ("PAN") to the customer's request,
  provide the temporary PAN and the customer data to an over-the-air (OTA) provisioning service,
  map the temporary PAN to a mobile PAN, and
  transmit the mobile PAN to the OTA provisioning service thereby updating an application and mobile PAN on the mobile device whereby the mobile device is activated shortly after the request is received and enabling the mobile device to conduct payment transactions involving the new payment account.

2. The apparatus of claim 1, wherein the storage device further stores instructions adapted to be executed by said processor to:
 assign at least a first risk parameter to the request, and
 cause the application on the mobile device to be updated to include the at least first risk parameter, the at least first risk parameter limiting payment transactions involving the new payment account.

3. The apparatus of claim 2, wherein the at least first risk parameter is associated with at least one of: (i) a single transaction amount, (ii) an overall transaction amount, or (iii) a transaction type.

4. The apparatus of claim 2, wherein the storage device further stores instructions adapted to be executed by said processor to:
 after personalization of the mobile device, receive an actual PAN, and
 map the actual PAN to the mobile PAN.

5. The apparatus of claim 4, wherein the storage device further stores instructions adapted to be executed by said processor to:
 facilitate an update of said mobile device by resetting said at least first risk parameter.

6. The apparatus of claim 1, wherein the mobile device is associated with at least one of: (i) a wireless telephone, or (ii) a personal digital assistant, and further comprising:
 facilitating execution of a transaction at a point of sale device using the temporary PAN.

7. The apparatus of claim 1, wherein personalization of the mobile device is performed using a wireless application protocol push process or Bearer Independent Protocol (BIP).

8. A method for instantly issuing a payment account for use in a mobile device, comprising:
 receiving at a processor a request for a new payment account to be associated with a mobile device;
 automatically assigning, by the processor, a temporary payment account number ("PAN") to the customer's request;
 providing the temporary PAN and the customer data to an over-the-air (OTA) provisioning service;
 mapping the temporary PAN to a mobile PAN; and
 transmitting the mobile PAN to the OTA provisioning service which updates a payment application and mobile PAN on the mobile device, enabling the mobile device to conduct payment transactions involving the new payment account shortly after the request is received.

9. The method of claim 8, further comprising:
 assigning at least a first risk parameter to the request; and
 transmitting data to facilitate a personalization of the mobile device by updating the payment application on the mobile device to include the at least first risk parameter.

10. The method of claim 9, wherein the at least first risk parameter is associated with at least one of: (i) a single transaction amount, (ii) an overall transaction amount, or (iii) a transaction type.

11. The method of claim 9, further comprising:
 after said personalizing the mobile device, receiving an actual PAN; and
 mapping the actual PAN to the mobile PAN.

12. The method of claim 11, further comprising:
 updating said mobile device by resetting said at least first risk parameter.

13. The method of claim 8, wherein the mobile device is associated with at least one of: (i) a wireless telephone, or (ii) a personal digital assistant.

14. The method of claim 8, wherein personalization of the mobile device is performed using a wireless application protocol push process or Bearer Independent Protocol (BIP).

15. A system, comprising:
 an issuer system which receives, from a customer associated with a mobile device, a request to use the mobile device as a near-field communications (NFC) enabled purchasing token associated with a new payment account, the request including customer data, and wherein the issuer system selects and transmits a temporary payment account number (PAN) for association with the mobile device;
 an over the air provisioning service which receives the temporary PAN and the customer data from the issuer system, wherein the over the air provisioning service transmits a message requesting a NFC identifier, receives a mobile PAN, and updates a payment application on the mobile device to include the mobile PAN such that the mobile device is activated shortly after the request is received by the issuer system for use in conducting payment transactions involving the new payment account; and
 a PAN mapping/account generation service which receives the request from the over the air provisioning service, assigns a mobile PAN to the mobile device, maps the mobile PAN to the temporary PAN, and transmits the mobile PAN to the over the air provisioning service.

16. The system of claim 15, further comprising a mobile carrier between the over the air provisioning service and the mobile device.

17. The system of claim 16, wherein a personalization of the mobile device is performed by the mobile carrier using a wireless application protocol push process or Bearer Independent Protocol (BIP).

18. The system of claim 15, wherein the issuer system further provides at least one risk parameter to the over the air provisioning service in connection with the temporary PAN.

19. The system of claim 15, wherein the mobile device is associated with at least one of: (i) a wireless telephone, or (ii) a personal digital assistant.

20. The system of claim 15, wherein the temporary PAN is subsequently replaced with an actual PAN.

* * * * *